(12) United States Patent
Omiya et al.

(10) Patent No.: US 7,676,789 B2
(45) Date of Patent: Mar. 9, 2010

(54) ARCHITECTURE FOR CUSTOMIZABLE APPLICATIONS

(75) Inventors: Elliot Omiya, Kirkland, WA (US); Todd Jefferson, Seattle, WA (US); Andrew Clinick, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 11/183,195

(22) Filed: Jul. 15, 2005

(65) Prior Publication Data

US 2005/0251797 A1 Nov. 10, 2005

Related U.S. Application Data

(63) Continuation of application No. 09/678,511, filed on Oct. 3, 2000, now abandoned.

(51) Int. Cl.
*G06F 9/44* (2006.01)
(52) U.S. Cl. .................. 717/106; 717/107; 717/108; 717/109; 717/110; 717/111; 717/113; 717/162; 717/166
(58) Field of Classification Search ............. 717/106, 717/107, 108, 109, 110, 111, 113, 162, 166
See application file for complete search history.

(56) References Cited

U.S. PATENT DOCUMENTS

| | | | | |
|---|---|---|---|---|
| 5,583,983 A | * | 12/1996 | Schmitter | 717/138 |
| 5,603,034 A | * | 2/1997 | Swanson | 717/111 |
| 5,627,959 A | | 5/1997 | Brown et al. | 395/356 |
| 5,634,124 A | | 5/1997 | Khoyi et al. | 395/614 |
| 5,724,589 A | | 3/1998 | Wold | 395/701 |
| 5,787,431 A | | 7/1998 | Shaughnessy | 707/100 |
| 5,845,128 A | * | 12/1998 | Noble et al. | 717/170 |

(Continued)

FOREIGN PATENT DOCUMENTS

EP 0 660 231 A2 6/1995

(Continued)

OTHER PUBLICATIONS

Gulla, J. A. "A General Explanation Component for Conceptual Modeling in Case Environments", 1996, ACM, p. 297-329.*

(Continued)

*Primary Examiner*—Wei Y Zhen
*Assistant Examiner*—Qamrun Nahar
(74) *Attorney, Agent, or Firm*—Woodcock Washburn LLP

(57) ABSTRACT

An architecture for customizable applications includes an application object and a customization object. The application object has internal logic that performs a set of fixed or predetermined actions, and a public object model. The public object model includes a set of public methods that are invocable on the application object, and a set of event source which are methods that can be implemented by a programmer and are called by the internal logic of the application object. By implementing methods invocable by the event sources, it is possible to extend and customize the functionality of the application object. The customizations are stored in a customization database for retrieval during the dynamic operation of the application object. Each customization may be identified by a "moniker," which is a string having a hierarchical format. The moniker is derived partly from fixed data known to the application object, and partly from environmental data that is ascertained by the application object at run time.

20 Claims, 10 Drawing Sheets

U.S. PATENT DOCUMENTS

| | | | | |
|---|---|---|---|---|
| 5,953,524 | A * | 9/1999 | Meng et al. | 717/108 |
| 5,970,252 | A * | 10/1999 | Buxton et al. | 717/166 |
| 5,978,579 | A * | 11/1999 | Buxton et al. | 717/107 |
| 6,023,578 | A * | 2/2000 | Birsan et al. | 717/105 |
| 6,088,698 | A | 7/2000 | Lipkin | |
| 6,093,215 | A * | 7/2000 | Buxton et al. | 717/107 |
| 6,237,135 | B1 * | 5/2001 | Timbol | 717/107 |
| 6,266,716 | B1 | 7/2001 | Wilson et al. | 710/33 |
| 6,282,568 | B1 | 8/2001 | Sondur et al. | 709/223 |
| 6,363,433 | B1 | 3/2002 | Nakajima | 709/313 |
| 6,370,531 | B1 | 4/2002 | Boutcher et al. | 707/10 |
| 6,374,238 | B1 | 4/2002 | Iwata et al. | 707/3 |
| 6,424,979 | B1 | 7/2002 | Livingston et al. | 707/511 |
| 6,654,029 | B1 | 11/2003 | Chiu et al. | 345/717 |

FOREIGN PATENT DOCUMENTS

| | | |
|---|---|---|
| WO | WO 99/32998 | 7/1999 |
| WO | WO 00/33187 A1 | 6/2000 |

OTHER PUBLICATIONS

Frolund, et al. "Design-Time Simulation of a Large-Scale, Distributed Object System", 1999, ACM, p. 374-400.*

"Visual dBase Object Solutions Page", Jan. 9, 1999, http://www.total.net/~sproket/articles/a1.

Keckler, S.W. et al., "Concurrent Event Handling through Multithreading", *IEEE*, 1999, 903-916.

Ken Bergmann, "Events vs. Callbacks", 1997, http://msdn.microsoft.com/library/techart/msdn_evntvscb.htm, 1-2.

Sara Williams and Charlie Kindel, "The Component Object Model: A Technical Overview", Oct. 1994, http://msdn.microsoft.com/library/techart/msdn_comppr.htm, 1-20.

Watanabe, H. et al., "A Flexible Control Mechanism for Managing Interrelated/Interdependent Tasks Successively", *IEEE*, 1994, 78-83.

* cited by examiner

ARCHITECTURE FOR CUSTOMIZABLE APPLICATIONS

CROSS-REFERENCE TO RELATED CASES

This is a continuation of U.S. patent application Ser. No. 09/678,511, originally entitled "Architecture for Customizable Applications," filed on Oct. 3, 2000.

FIELD OF THE INVENTION

The present invention relates generally to the field of computing. More particularly, the invention is directed to the customization of software applications.

BACKGROUND OF THE INVENTION

As the computer industry has grown, numerous commercial software products have become available. It is now possible to buy "off-the-shelf" software for a variety of applications. However, off-the-shelf software has a significant drawback: it comes pre-configured to perform actions in a certain way—that is, it comes with a pre-determined "model" of the task that it is designed to perform. Unfortunately, computer users' needs do not always fit neatly into that model. Stated succinctly, when it comes to software, one size does not fit all.

For example, a user may purchase an off-the-shelf program to prepare invoices for a business. One of the functions performed by the program may be the computation of sales tax for the invoice, and the program may be designed with the understanding that the applicable tax rate is based on the state in which the sale occurred. The program, however, may be designed with the assumption a tax rate is uniform throughout a given state, and thus may be unable to compute sales tax in states where the tax rate varies by zip code. Moreover, since the program is delivered to the user as a self-contained, fixed set of instructions, there may be no way to add to the program the instructions that would compute the sales tax based on the zip code. In this case, the off-the-shelf program almost fits what the user needs to do, and yet the program is effectively unsuitable for the user's invoice needs, because the program's "model" of how to compute sales tax does not quite do what the user needs, and cannot be extended to do so. What is needed in this example is the ability to customize the off-the-shelf invoice program to compute sales tax according to whatever formula a user might need.

There are various solutions to the problem of customizing software, none of which are completely satisfactory. For example, it is common practice in the field of business software for the manufacturer of the software to rewrite a base program (e.g., an invoice program) to a customer's specifications. The customer's requirements are inserted into the source code by the manufacturer, the source code is recompiled, and a custom-built piece of software is delivered to the customer. This solution has the drawbacks that: (1) it is labor-intensive; and (2) there may be no consistency in the manner in which modifications to the original base program are performed, which makes it difficult to service and upgrade the custom-built programs.

Another solution is to use an interpretable script-type language for the application, in which case the source code is available to the user and customizations can be added as needed. Interpreted programs, however, are slower than compiled programs, and an interpreted program may not be able to meet the stringent performance requirements that apply in some circumstances.

Moreover, there do not currently exist any well-defined techniques or methods to customize applications that are built upon many "tiers" of machines and distributed via a loosely coupled, wide area network (typically the Internet). Prior systems that support some type of customization, such as Visual Basic for Applications (VBA), are most appropriate for desktop applications (such as the MICROSOFT EXCEL spreadsheet, or the MICROSOFT WORD word processor), and those techniques are not well suited for distributed applications.

In view of the foregoing, there is clearly a need for a system that overcomes the limitations and drawbacks of the prior art.

SUMMARY OF THE INVENTION

The invention provides a system and method for the customization of applications, and an environment in which customized applications may execute. A customized application includes an "application object" and a "customization."

The "application object" is a software component that contains logic to implement a generalized process, and the "customization" implements specific logic that causes the application object to behave in a certain "customized" manner for a given instantiation of the application object. For example, an application object may implement the general process of preparing an invoice, and a customization designed to work with that application object may compute the sales tax for the invoice based on zip codes. A "business object" is a particularly useful type of application object that implements a business process (such as preparing an invoice), although application objects are not limited to business processes.

The application object includes a type of interface called a "public object model." The public object model includes a set of "events" that are "fired" by the application object during its execution, as well as the information that is necessary for a customization to be able to interact with these events. The public object model for a given application object is made available to the public at large, so that programmers can write customizations that work with the application object. A customization takes the form of a set of code sequences that are to be executed when particular events are fired by the application. As the application object executes, it fires events, which are processed by an event handler. In response to a given event, the event handler invokes the appropriate code from the customization.

Customizations are stored in a "customization store," which is preferably (but not mandatorily) a database. There may be numerous customizations that can work with a given application object, and storage of these customizations in a database allows for convenient and efficient retrieval of an appropriate customization. The customization itself preferably takes the form of machine-executable binary code (i.e., code that has already been compiled); one advantage of storing customizations in machine-executable form rather than in the form of interpretable scripts is that machine-executable code can be executed more quickly. A "script engine" may be used to convert textual (i.e., high-level) descriptions of the customizations into machine-executable form.

Each customization stored in the database is indexed by a "moniker." The moniker is a label that identifies the customization in the customization store (e.g. database). Preferably, the moniker is a string that identifies at least the application object to which the customization relates, and the user for whom it has been customized, although the moniker may contain other (or entirely different) elements. As one example, the application object may be part of a module of an application that has been installed for use by a particular company, and each customization may be particular to a department of the company and a user in the department. In this case, the moniker may have several fields, separated by slashes, of the form:

CompanyName://ApplicationName/Module/ApplicationObjName/Dept/User

The business object may construct the moniker based both on fixed data as well as context. For example, an application object may comprise fixed data that specifies the company, application, and module of which it is a part, as well as its own name, and that same application object may contain code to derive the relevant department and username from the context in which it is executing.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Numerous commercial software applications are available for today's computer users. Consumers can find commercially-available software to address a vast array of computing needs. While software has become increasingly versatile, it is not possible for the designers of a given commercial software product to anticipate each and every specialized need that a software consumer might have. Customizable software allows consumers to extend the functionality of off-the-shelf applications to fit a wider variety of needs.

An Exemplary Computing Environment

Figure 1:
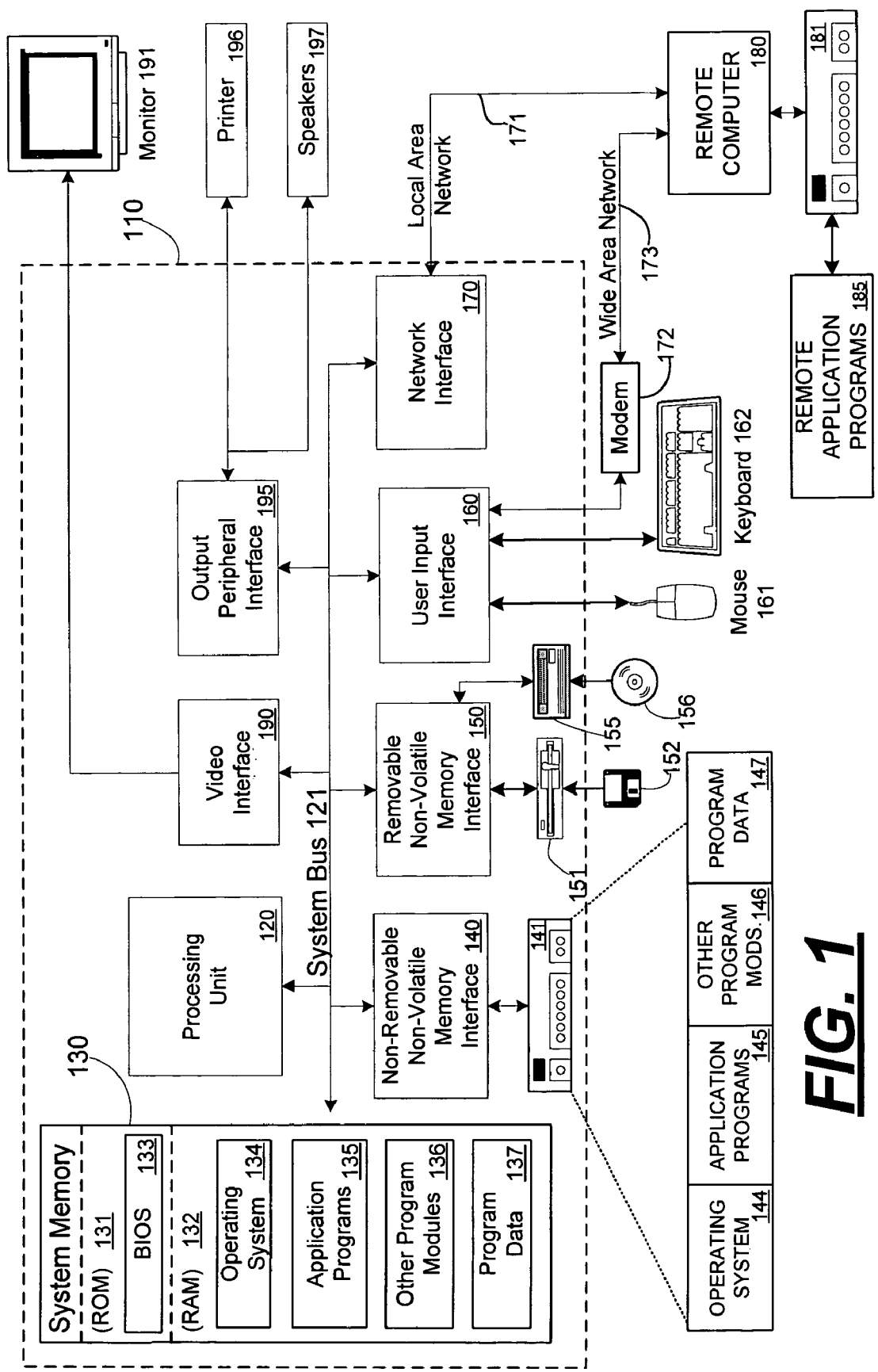
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Multi-Tiered Environments

Figure 2:
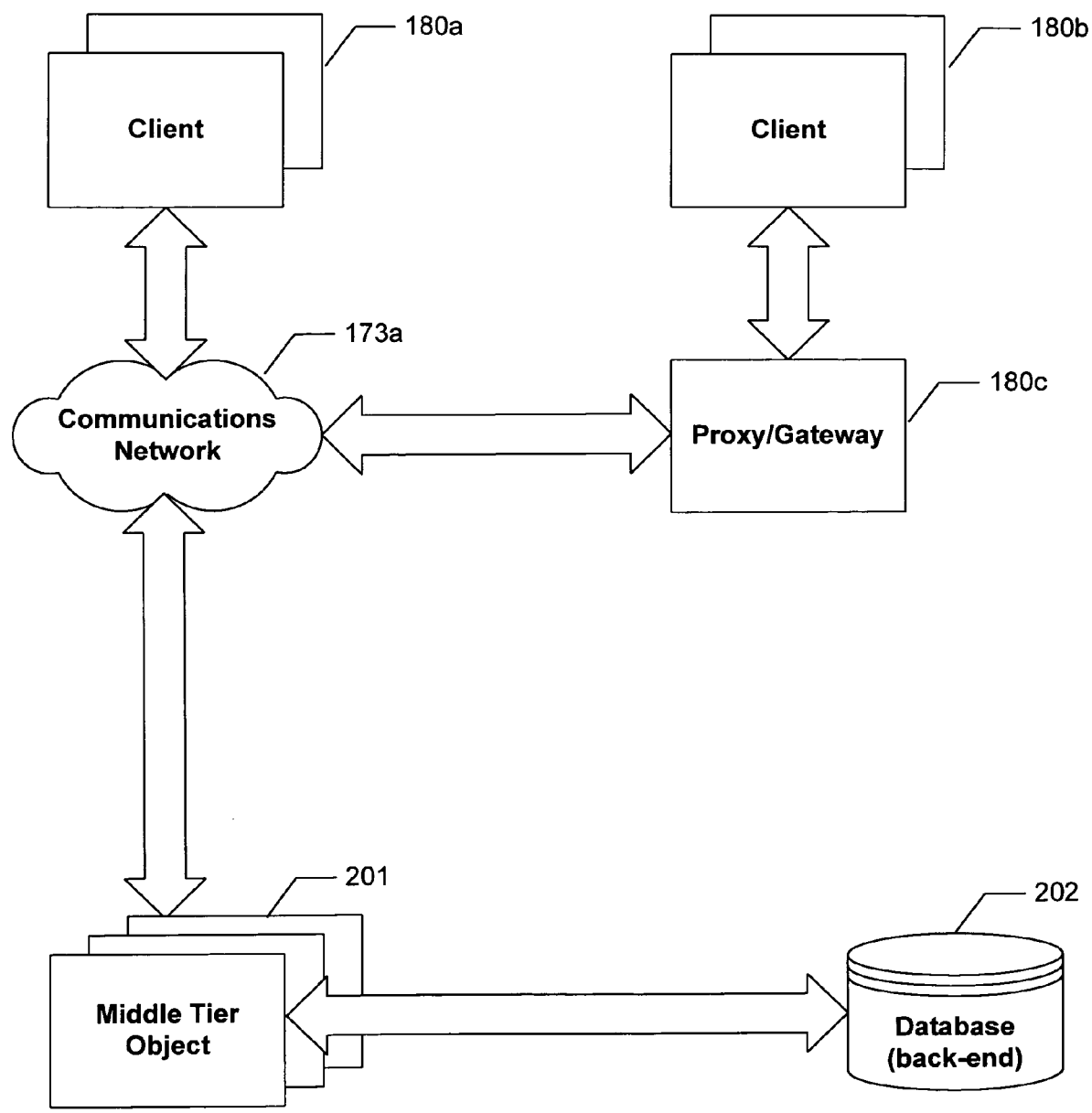
FIG. 2 is a block diagram of an exemplary multi-tier architecture in which aspects of the invention may be implemented.

It is often useful for computing applications to function in a distributed environment. The wide availability of computer networks increases the speed and connectivity of communication between computers, which ease of communication that they provide, makes it possible for various functions of a computing application to be performed by different components that may reside on different computers. FIG. 2 shows a multi-tiered architecture, which is a particularly advantageous type of distributed environment for some applications.

Referring now to FIG. 2, one or more clients 180a and 180b communicatively connect to a middle tier object via communications network 173. Clients 180a and 180b may, for example, be remote computers such as remote computer 180 shown in FIG. 1. Communications network 173a may be a wide area network, such as wide-area network 173 shown in FIG. 1. Alternatively, communications network 173a may be a local area network (such as LAN 171 shown in FIG. 1), or any other means by which computers may communicate. Client 180a is connected to communications network 173a directly, while client 180b is connected to communications network 173a via proxy/gateway 180c. Proxy/gateway 180c may be a computer (again, such as remote computer 180) which executes firewall software, or which otherwise mediates and/or enables communication between client 180b and communications network 173a.

Middle tier object 201 is a software object that executes on a computer (such as computer 100 shown in FIG. 1). Middle tier object may fulfill the role of a "server," in that it provides services that are sought by clients 180a and 180b. As shown in FIG. 2, middle tier object 201 is communicatively connected to communications network 173a by means of which it may communicate with clients 180a and 180b. For example, clients 180a and 180b may request services or information from middle tier object 201 through communications network 173a, and middle tier object 201 may provide responsive data through that same network.

Middle tier object 201 may be associated with back end object such as database 202. Database 202 is a "back-end" object in the sense that it does not communicate directly with clients 180a and 180b, which is to say that its functionality is not directly exposed to the clients. For example, clients 180a and 180b may be able to submit high-level requests for information to middle-tier object 201, and middle-tier object 201 may, in turn, submit low-level database lookup and retrieval requests to database 202. Middle-tier object may then organize the retrieved information in a format that is useful to clients 180a and 180b and then transmit that information to them, without exposing the details of the database lookup operation to clients 180a and 180b. In this way, the use of "back-end" objects allows middle-tier object 201 to provide clients 180a and 180b with a high-level abstraction of the function that middle-tier object 201 performs.

Database 202 may be physically located on the same computing device as middle-tier object 201, or it may be located on a different computing device. If database 202 is located on a different computing device, then a communications means (not shown) is used to connect database 202 with the computing device that hosts middle tier object 201. Communications network 173a may be used as this communications means, although doing so may make back-end database 202 directly accessible to clients 180a and 180b, which may be disadvantageous for some applications.

While FIG. 2 shows clients 180a and 180b connected to middle-tier object 201 via a communications network 173a, it may be the case that all objects may reside on a single multi-tasking computer. For example, clients 180a and 180b, and middle-tier object 201, may all reside on a single computer and each have their own allotment of addressable memory and processor time, in which case interaction between the object may take place via interprocess communication means instead of communications network 173. In such a case, the various objects shown in FIG. 2 represent a convenient division of components of a system rather that a distribution of functions among different computers.

Environment for Customizable Applications

Figure 3:
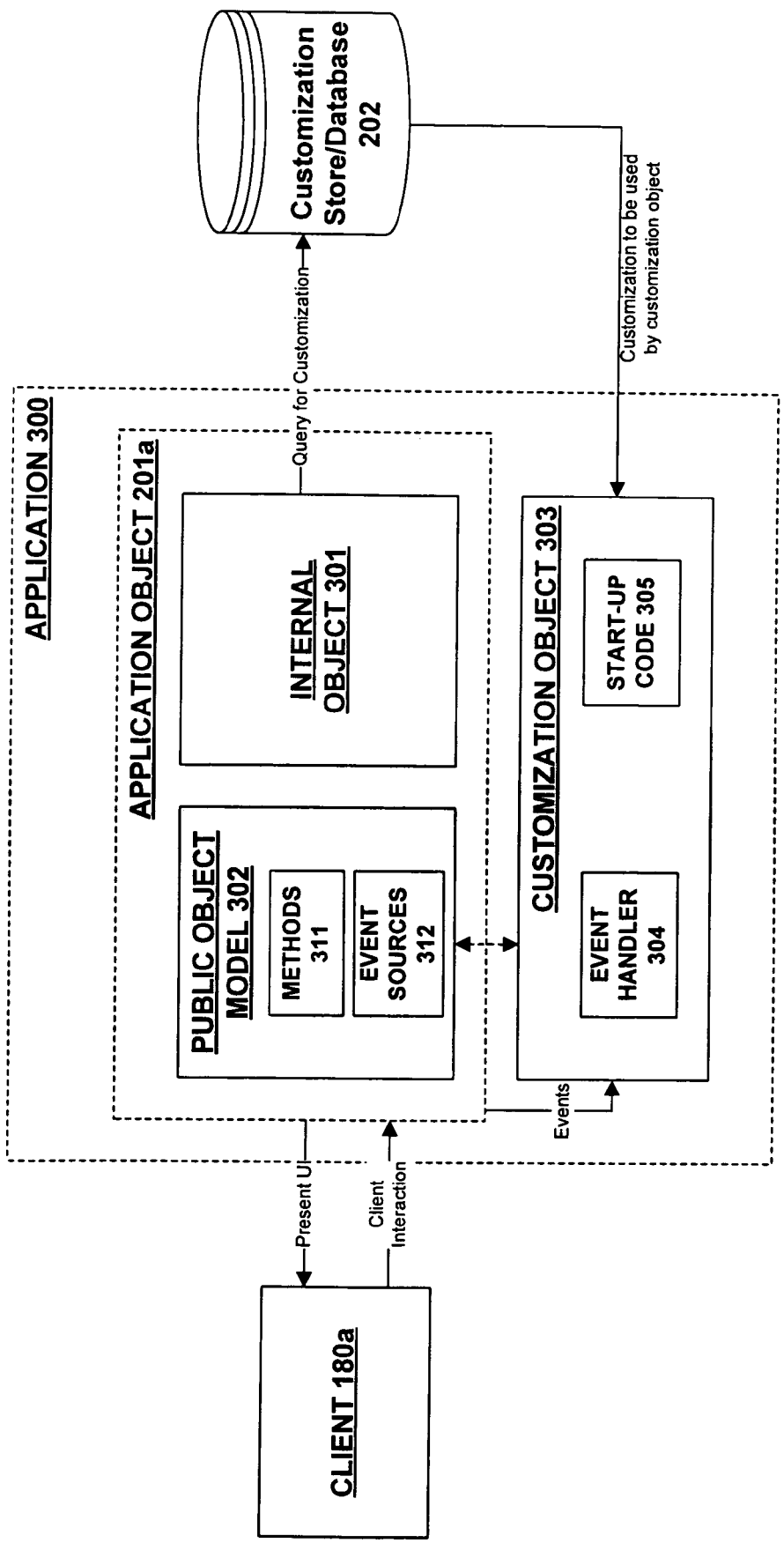
FIG. 3 is a block diagram of an exemplary environment for a customizable application object in accordance with the invention.

FIG. 3 shows an exemplary architecture for a customizable application. Application 300 is a collection of one or more software components that performs one or more functions. For example, application 300 may be an accounting system that generates invoices, payments, reports, etc., for a business. Application 300 may be a single self-contained computer program, but it is preferably a collection of individual "application objects," each of which performs a discrete function. For example, application 300 may be a suite of accounting programs (perhaps with a common "front-door" interface provided by application 300), where each separate accounting function (e.g., generation of invoices, writing checks for payments, generation of reports, etc.) is performed by a separate application object. Each of the separate objects is, in essence, a middle-tier object 201 (as shown in FIG. 2), in that each application object can operate separately and can communicate directly with a client, such as client 180.

Thus, in FIG. 3, application 300 comprises application object 201a. For simplicity, a single application object 201a is shown in FIG. 3, although it will be appreciated that application 300 may actually comprise a plurality of application objects. Application object 201a comprises an internal object 301 and a public object model 302. Internal object 301 includes the logic that performs the application's basic functions. In general, the logic of internal object 301 is predetermined: the developer of application object 201a writes a fixed set of instructions (generally in a source-level language), and internal logic 301 comprises the machine-executable instructions that result from the compilation of the source-language instructions written by the developer.

Public object model 302 describes those portions of the functionality of application object 201a that can interact with the world outside of application object 201a. This functionality can be thought of as "hooks" into application object 201a. Public object model 302 may, for example, take the form of an interface into application object 201a, or, as another example, a self-describing class. Public object model 302 preferably includes two types of "hooks": a set of "methods" 311, and a set of "event sources" 312. A "method" is a unit of instructions, identifiable by a name, which can be invoked on a particular instance of application object 201a. An "event source" is a description of a method that a customization (see below) can implement and that application object 201a will invoke at a particular point in time. It may be convenient to think of certain embodiments of public object model 302 as including two interfaces: a first interface (sometimes called the "application interface") that describes the methods, and a second interface (sometimes called the "event source" interface) that describes the event sources. Public object model 302 is "public" in the sense that it is preferably well-known (or at least publicly available), so that programmers can customize application object 201a by using the public methods and by writing customized code that can be invoked by the event sources.

The relationship between internal object 301 and public object model 302 can best be illustrated as follows. If application object 201a is a program that prepares invoices, that program may contain logic to display line-items of the invoice as part of internal object 301. This logic may be predetermined and unchanging, due to the fact that every invoice has items organized into lines (or, more precisely, the developer of the program may make this assumption in designing application object 201a). Application object 201a may also include, as part of its public object model 302, a public method whose return value is the subtotal (i.e., the pre-tax total of all line items). Application object 201a may also "fire" an event once the subtotal has been computed, in order to give programmers an opportunity to compute the sales tax in a specified manner. The name of the event, and the fact that it is fired upon computation of the subtotal, is part of public object model 302. Thus a programmer is given the opportunity to create a custom sale tax computation routine (e.g., one that bases the tax rate on the zip code), by writing code, identified by the name of the event, that will be invoked upon firing of that event. Such code may, for example, use the above-mentioned public method to retrieve the subtotal so that such subtotal can be multiplied by the tax rate in order to compute the sales tax.

It should be observed at this point that public object model 302 is significant in that it allows a programmer to customize application object 201a without having access to the source code of application object 201a. It should also be observed that application object 201a can be revised or updated and, as long as the revised version has the same public object model 302 as the original version, customizations written for the old version will work with the new version.

Figure 4:
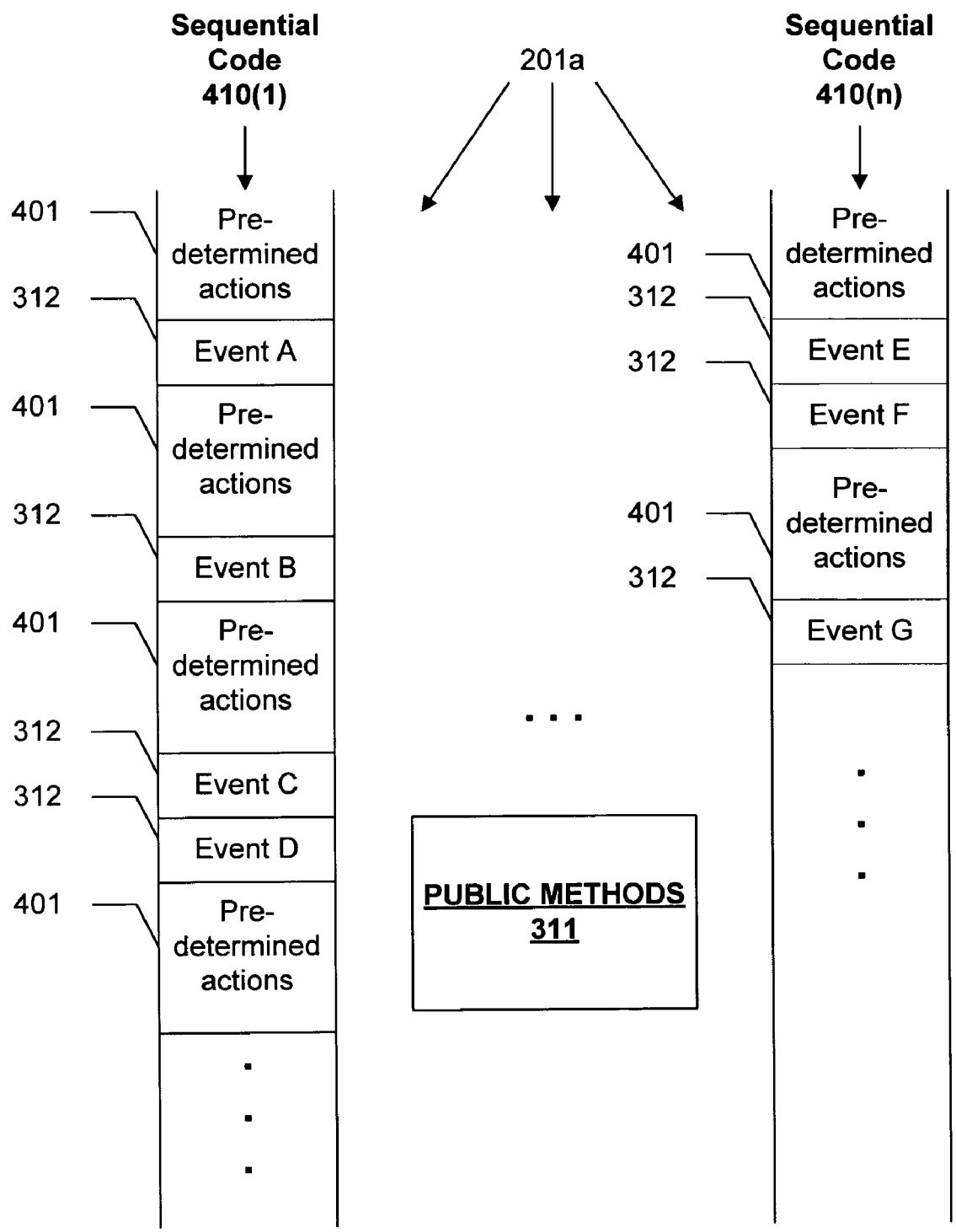
FIG. 4 is a diagram showing an aspect of the structure of code in an application object, in accordance with the invention.

FIG. 4 depicts the structure of application object 201a as a collection of instructions including both predetermined actions 401 and events 312. Application object 201a includes executable code that executes in a sequence 401(1). FIG. 4 shows a plurality of code sequences 401(1) through 401(n), because application object 201a may, in fact, have plural threads of execution that execute concurrently, and thus not all of the code of application object 201a can be viewed as executing in a single sequence.

The executable code in each sequence includes code that performs one or more predetermined actions 401. Between execution of the predetermined actions, one or more events 312 may be fired. As described above, events 312 are part of public object model 302, such that a programmer is given the opportunity to write code that executes in response to the firing of events 312. Predetermined actions 401 are essentially part of internal object 301. Predetermined actions 401 execute but do not provide an opportunity for direct interaction with code outside of application object 201a. Stated another way, predetermined actions 401 are not directly accessible via public object model 302.

Application object 201a also includes public methods 311. Public methods 311 are part of the logic contained in application object 201a. As discussed above, these methods are also part of public object model 302, and code that is external to application object 201a may invoke public methods 311. Public methods 311 may also be invoked by sequential code 410(1) through 410(n), but need not be. For example, a method that returns the subtotal of an invoice may be called by internal object 301 if retrieving the subtotal is part of a predetermined action 401 that application object 201a performs. However, some public methods 311 are never invoked by predetermined actions 401 and exist only for the purpose of being called by customizations 320 (described below).

Returning now to FIG. 3, application object is coupled to a database 202. Database 202 serves the function of a "customization store" in that it stores one or more customizations 320 for application object 201a. A customization is a unit of code that is designed to work with application object 201a based on public object model 302. It will be appreciated that, while a database is a convenient structure for storing customizations, the customization store may be implemented using any means that are capable of storing and retrieving information. Thus, while the customization store is referred to herein as "customization store/database 202," the customization store is not limited to implementations that use a database. In fact, as further discussed below in connection with FIG. 11, it is possible to put a layer of abstraction on top of customization store/database 202 (e.g., by making it callable either locally or remotely via HTTP and SOAP), such that the nature of customization store/database 202 and its implementation are transparent to application object 201a.

Figure 5:
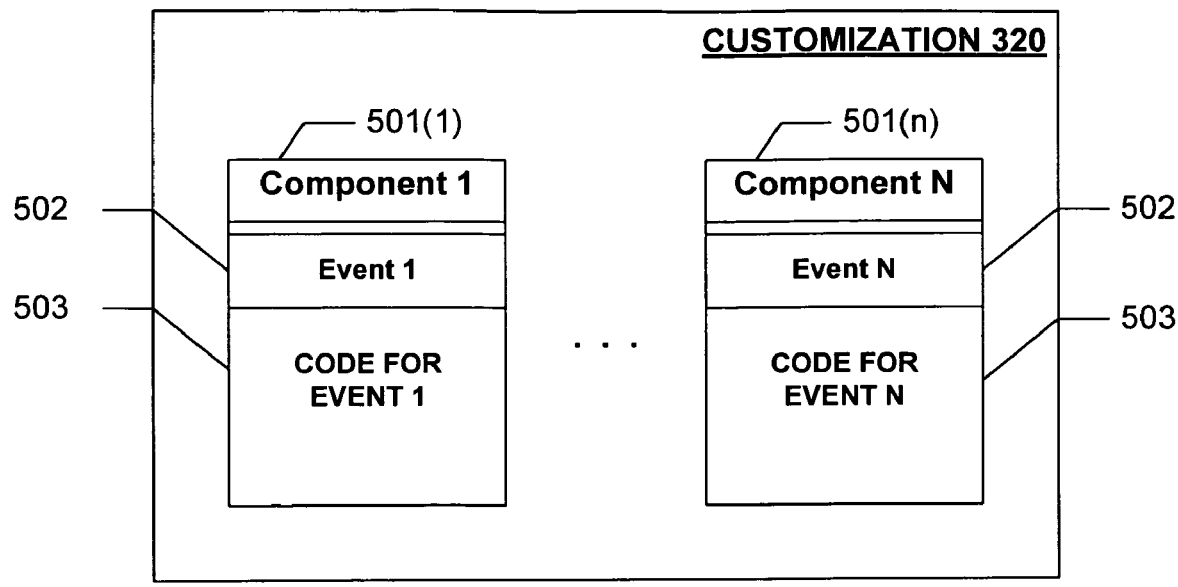
FIG. 5 is a block diagram showing an exemplary structure of customized code.

As shown in FIG. 5, each customization 320 may contain one or more components 501(1) through 501(n), with each component containing the code that is invoked upon the firing of a particular event 312. Each component includes a label or reference 502 to the particular event to which it corresponds, as well as the code 503 that is actually executed in response to the event. Code 503 is preferably in machine-executable form. Machine-executable form, as previously discussed, is preferably to interpretable script, because it can be executed faster. Code 503 may include calls to one or more public methods 311. Customization 320 may contain a component corresponding to each and every event in public object model 302, or it may contain components corresponding to only a proper subset of the events in public object model 302. For example, some events 312 fired by application 201a may not be of interest to a particular customization. Continuing with the previous example, an event that is fired upon computation of the subtotal may not be of interest to a customization for use in a jurisdiction that has no sales tax, since no tax computation needs to be performed in response to computation of the subtotal.

Figure 6:
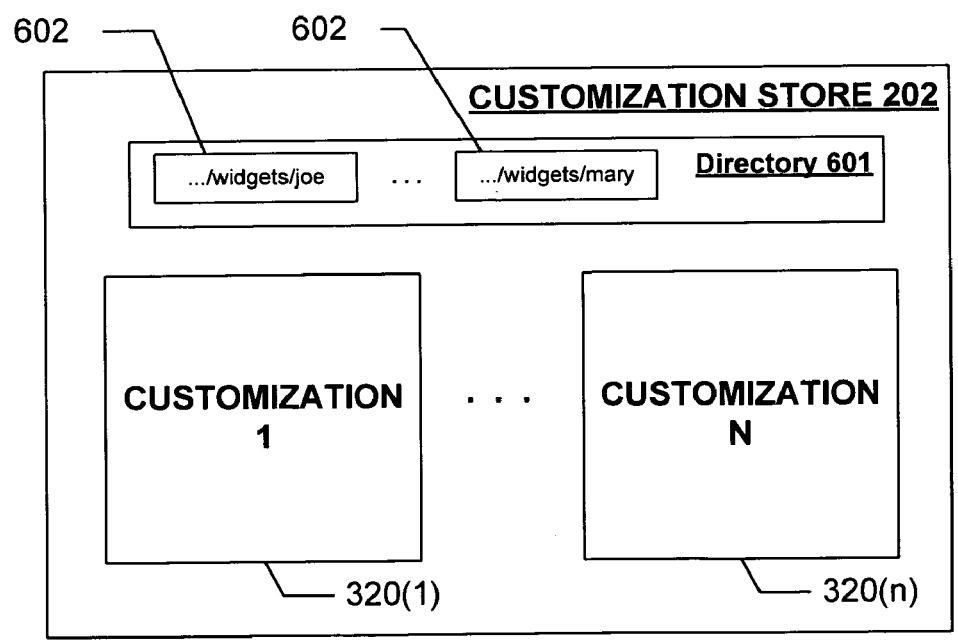
FIG. 6 is a block diagram showing an exemplary structure of a customization store.

One purpose of customizations 320 is to allow a single application object 201a to behave in a different ways depending on the different needs of different users. Thus, customization store/database 202 preferably stores a plurality of customizations 320. FIG. 6 shows a customization store/database 202 storing a plurality of customizations 320(1) through 320(n). Customization store/database 202 also includes, or is associated with, a directory 601, that allows customizations 320(1) through 320(n) to be indexed by attributes 602. Thus, application object 201a may request a customization 320 by forming a database query, in response to which database 202 retrieves an appropriate customization 320 for use with application object 201a. It should be noted that the attributes 602 shown in FIG. 6 are in the form of "monikers." Monikers are further discussed below, and they are a particularly advantageous way in which to index customizations 320 in customization store/database 202, although it will be appreciated that customizations 320 may be indexed in database 202 in any manner without departing from the spirit and scope of the invention.

Returning to FIG. 3, application 300 further includes a customization object 303, which communicates with application object 201a. Customization object has access to public object model 302, and is invoked by the firing of events in internal object 301. Customization object 303 includes one or more event handlers 304 and start-up code 305. Start-up code 305 is code that "connects" customization object 303 with application object 201a upon invocation of customization object 303, in the sense that start-up code 305 initializes customization object 303 such that customization object 303 can process events for application object 201a.

Figure 7:
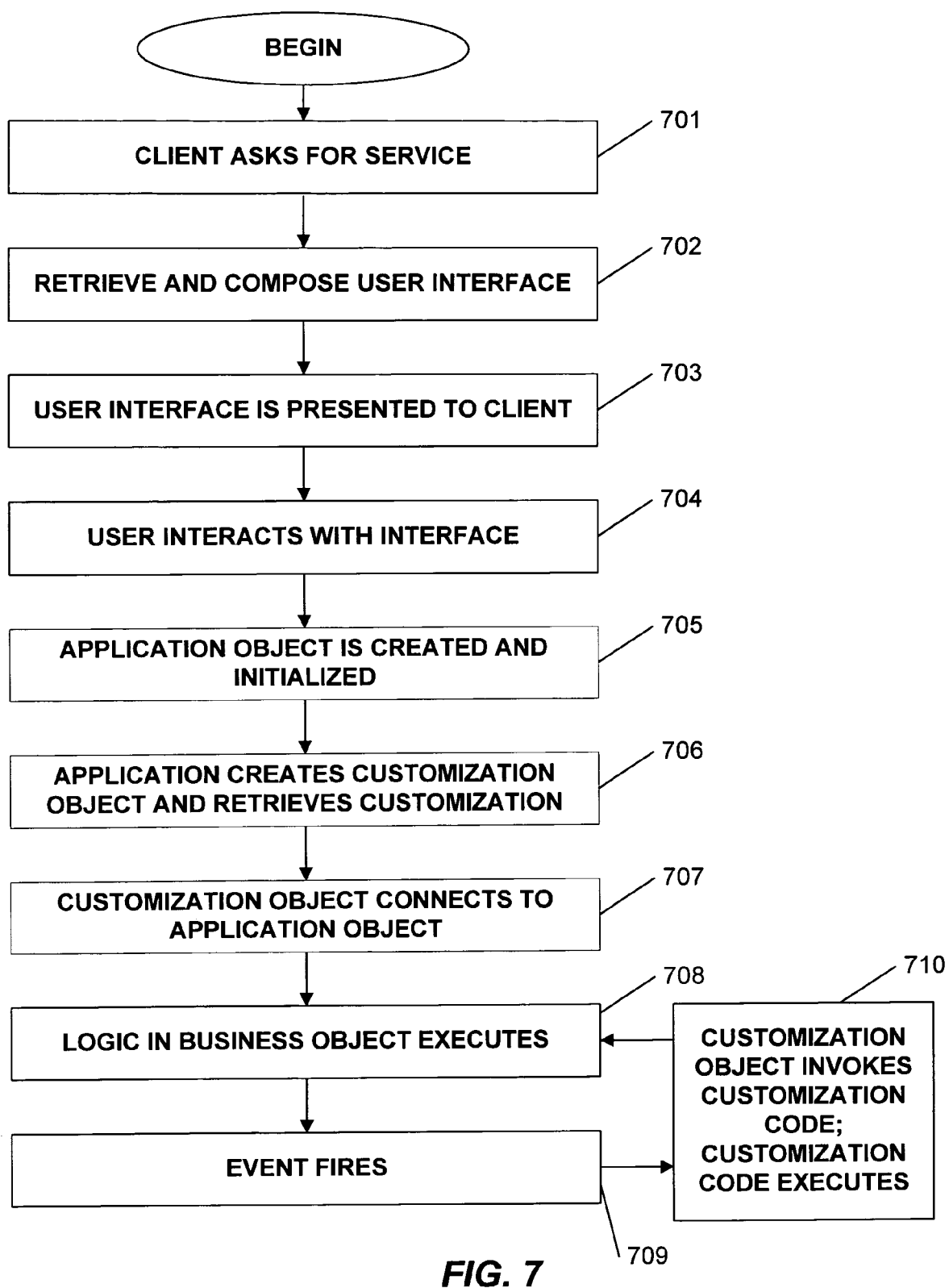
FIG. 7 is a flow diagram showing an exemplary process of using a customizable application object.

FIG. 7 shows the process carried out by the architecture of FIG. 3 in order to execute a customizable application. First (step 701) a client, such as client 180a, requests a service that is performable by application object 201a. For example, if application object 201a is a program that prepares invoices, then the request may be a request for a new blank invoice form that can be filled out on client 180a. In response to this request, a user interface is retrieved and composed at step 702. The user interface may be part of application 300, or may be provided by a separate server program (such as a "web server") operating in conjunction with application 300. At step 703, the user interface is presented to client 180a.

At step 704, a user is given the opportunity to interact with the interface (using client 180a). For example, the user may use the interface to fill in blanks in an invoice. The user's interaction is transmitted back to application 300.

At step 705, an instance of application object 201a is created and initialized. The application object 201a is instantiated in a process by the host operating system (or other operating environment) or by a service operating on behalf of the operating system. The created instance of application object 201a will be used to process whatever information the user provides at step 704. It will be appreciated that the interaction at step 704 may be an ongoing process, and application object 201a may be instantiated during that interaction (in order to process an ongoing interaction) rather than waiting for the interaction at step 704 to finish.

At step 706, customization object 303 is created and initialized, and a particular customization 320 is located and retrieved from customization store/database 202. As discussed above, this location and retrieval is preferably performed by application object 201a generating a database query and forwarding that query to customization store/database 202. The query is then processed by customization store/database 202 in order to locate and retrieve a particular customization 320. Either the customization itself, or a pointer or "handle" to such customization 320, is then provided to customization object 303, so that customization object 303 can use the retrieved customization 320 to process events At step 707, customization object 303 "connects" the retrieved customization 320 to application object 201a—i.e., it enables the components 501(1) through 501(n) of the retrieved customization to respond to events 312 generated by application object 201a. More specifically, event handlers 304 are set up to receive information generated during the course of application object 201a's execution that signifies that events 312 have been fired by application object 201a. When the customization 320 is compiled, (for example by a script engine) startup object 305 is created. The startup object has a method that is called that assigns pointers to event handlers 304 to event sources 312. During the normal course of application object 201's execution, any such connected event handlers 304 will be invoked. In addition, the startup method is provided a pointer to the public object model 302 and stored in a memory location that is accessible to the customization 320.

At step 708, the logic in application object 201a begins to execute. The logic that executes includes internal object 301. For example, one of the sequences 410(1) through 410(n) (shown in FIG. 4) may begin to execute, which may include some predetermined actions 401 and the firing of some events 312. At some point during the execution of such a sequence, an event 312 is fired (step 709). In response to the firing of an event, the event handler 304 is invoked, thereby causing customization object 303 to invoke one of components 501(1) through 501(n) of customization 320 (step 710). The particular component chosen for invocation is determined by the particular event fired; it will be recalled that each component includes a method body 502 that is connected to the event 312 being fired.

It will be appreciated at this point that, since the code of customization 320 is in binary form, all that needs to be done in order to invoke it is to load it in to the relevant address space and to execute it. These processes are readily apparent to one of skill in the art, and therefore need not be provided herein.

Also at step 710, the chosen component of customization 320 completes execution, and control of the program is returned to the internal object 301 of application object 201a. At this point step 708 is repeated, and the process continues until another event fires at step 709, or until application object 201a terminates (e.g., by completing execution of its instructions, or being terminated by the user).

Monikers

As discussed above, at step 706 a customization 320 is selected for use with application object 201a. Customization 320 may be selected by any means, and according to any criteria, but a particularly useful technique includes the use of monikers to form a database query. Preferably, the monikers are dynamically constructed during the running of application object 201a.

A "moniker" is a multi-part string that uniquely identifies the customization that is directly relevant to that particular invocation of the business object. The exact composition of the moniker is determined by the application's behavior and requirements. One application could, theoretically, have the same customization for all invocations of a given application object 201a. Another application can have different customizations for the same application object; for example, the customization can differ by user credentials ("per-user customization"). In the latter example, one sub-part of the moniker would contain the user's well-known handle ("user name") so that the customization that is directly relevant to that user can be loaded and invoked. This moniker scheme not only allows the invocation of a directly relevant customization; it also allows the storage mechanism for the customization (whether it be in source or binary form) to be identified by that same moniker. The moniker can be decomposed by a load and storage system (such as customization store 202) such that some or all of the moniker sub-parts can be used to do a "lookup" in the storage system to find a unique location to store or retrieve that customization.

Figure 8:
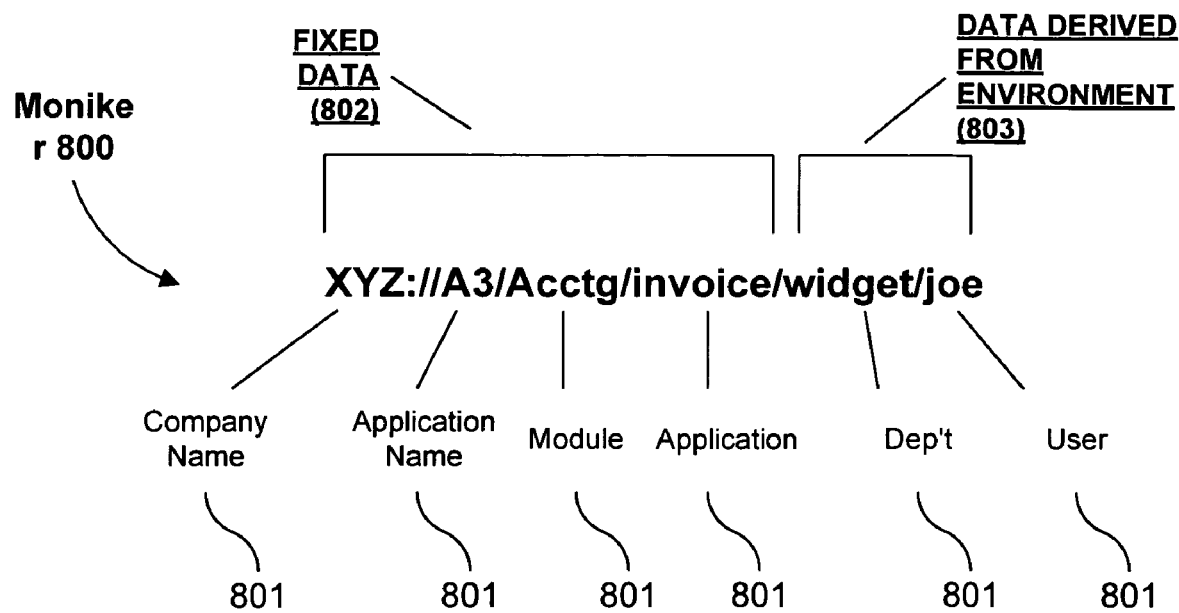
FIG. 8 is a diagram showing an exemplary structure of a moniker in accordance with aspects of the invention.

Referring now to FIG. 8, an example moniker 800 includes one or more fields 801. In FIG. 8, fields are shown as being separated by slashes. Preferably, the fields include both fixed data 802 and environmentally-derived data 803. Fixed data 802 is data that is known to application object 201a, and unchanging across different instantiations of application object 201a. Environmentally-derived data 803 is data that may be derived from the world outside of application object 201a. Environmentally-derived data 803 may vary across instantiations of application object 201a, since application object 201a may be instantiated in different environments.

In the example shown in FIG. 8, the fields based on fixed data 802 include a company name ("XYZ"), application name ("A3"), module ("Acctg"), and application object name ("Invoice"). These exemplary are derivable from "fixed" data because it is generally the case that an application object 201a knows the name of the company (or other entity) at which it has been installed, the name of the application and application module of which it is a part, and its own name. These facts may be represented as fixed data that exists in application 201a's binary file; thus, this data is available to every instantiation of application object 201a. Environmentally-derived data 803 in the example of FIG. 8 includes a department name ("widgets"), and a user name ("joe"). For the purpose of the example, it is presumed that the XYZ company has a "widgets" department, and that "joe" is a member of the widgets department. Furthermore, it is assumed that the A3 application and its modules and application objects have been installed for company-wide (rather than department-specific or user-specific) use, and thus that they do not have fixed data representing a department or user because this information would change with every instantiation. However, it is assumed that the department and user on whose behalf application object 201a is instantiated is part of the environment in which that instantiation occurs, and thus can be obtained by querying that environment.

Figure 9:
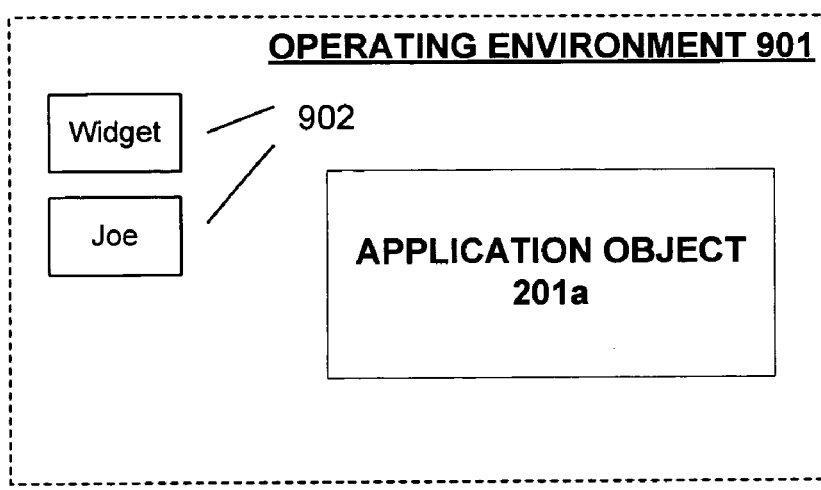
FIG. 9 is a block diagram showing an application object within an environment having attributes.

FIG. 9 shows application object 201a instantiated in an operating environment 901. Operating environment 901 may be an operating system such as operating system 134 (shown in FIG. 1), and it may have a "profile" that describes the user (and organization) of a particular computer on which it runs. In the example of FIG. 9, it is shown that the department ("widgets") and user ("joe") are attributes 902 of operating environment 901, and that those attributes 902 are accessible to an application object 201a running within operating environment 901. Thus, application object 201a can obtain the department and user attributes 902 by querying operating environment 901.

The process of creating a moniker 800 from which a customization 320 can be located and retrieved is now described with reference to FIG. 10. After application object 201a starts, it gathers or refers to its own fixed data 801. For example, application object 201*a* may collect the data describing the name of the company in which it is installed, the names of the application and module of which it is a part, and its own name. At step 1002, application object 201*a* proceeds to gather environmental data 802 by querying operating environment 901. This may be done, for example, by operating system routines that return the attributes of the currently-logged-in user, such as his login-name and the organization of which he is a part. At step 1003, the moniker string 800 is constructed using the fixed data 801 and the environmentally-obtained data 802. As discussed above, FIG. 8 shows an exemplary format of the moniker string 800, but a variety of formats could be used as well. It will be observed that the moniker string 800 shown in FIG. 8 is organized hierarchically, which may be a convenient format for monikers.

Figure 10:
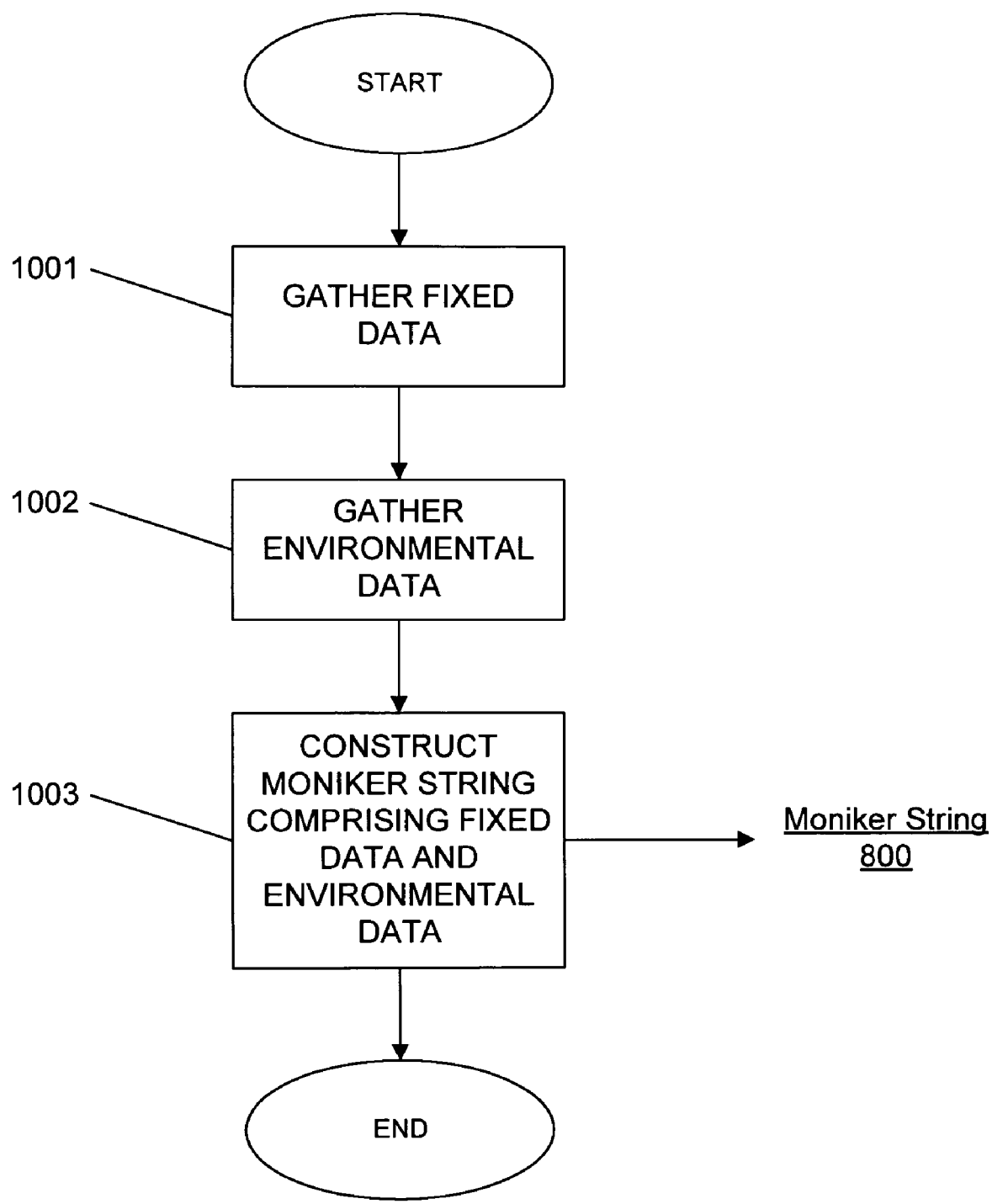
FIG. 10 is a flow diagram showing an exemplary process for the construction of a moniker string.

It will be observed that the process shown in FIG. 10 is, in essence, a convenient way of performing step 706 in FIG. 7. As noted in connection with FIG. 7, a particular customization 320 may be located in customization store 202 in any manner, but it is particularly convenient to index and locate customizations 320 by using monikers 800, and, in many contexts, it may be particularly advantageous for monikers 800 to be organized hierarchically in the manner shown in FIG. 8.

Figure 11:
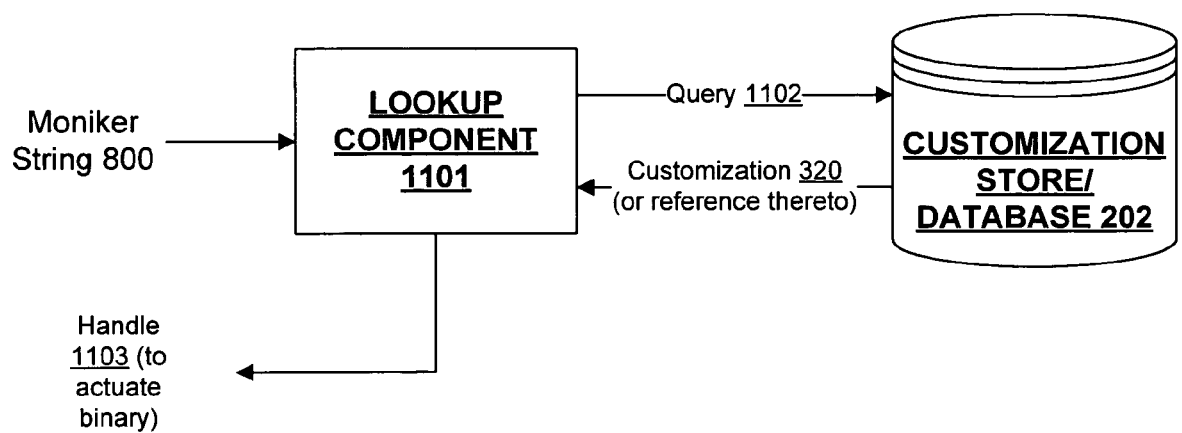
FIG. 11 is a block diagram showing an exemplary lookup object which may be used to locate customizations identified by monikers.

FIG. 11 shows an exemplary component that can be used during step 706 (of FIG. 7) to lookup and retrieve a customization 320 based on a moniker 800. After application object 201*a* constructs a moniker 800 based on the process shown in FIG. 10, moniker 800 may be passed to a lookup component 1101, which constructs a database query 1102 that either includes, or is based on, moniker 800. The format of the query depends on the particular database (or other type of system) that is used to implement customization store 202. As one non-limiting example, if customization store 202 is implemented using a MICROSOFT SQL database, then the query should be in a format such that it can be processed by such a database. When the query is passed to customization store 202, the query is processed, and a customization 320 (or reference thereto) is returned to lookup component 1101. The lookup component then returns to customization object 303 a "handle" 1103 that can be used to actuate the various components 501(1) through 501(*n*) of customization 320.

Lookup component 1101 may be invocable using the hypertext transport protocol (HTTP) and the simple object access protocol (SOAP). Thus, when it is necessary to retrieve a customization 320, the requesting component (e.g., application object 201*a*) can simply call lookup component 1101 with a particular moniker 800 using HTTP and SOAP. This provides a level of abstraction over the details of how or where customization store 202 is implemented. Since HTTP can be used to communicate with both local and remote objects, the same call to lookup object 1101 can be used whether customization store is a local database residing on the same computing device that executes application object 201*a*, or some other information storage means such as a file system on a remote computer.

It will be apparent to those of skill in the art that lookup component 1101 may be implemented as a software module running on a computer, such as the computer that runs application object 201*a*. Moreover, the details of how to convert a string (such as moniker 800) into a database query would be apparent to those of skill in the art and thus the code for such is not provided herein.

Creation of a Customization: Design Time

Figure 12:
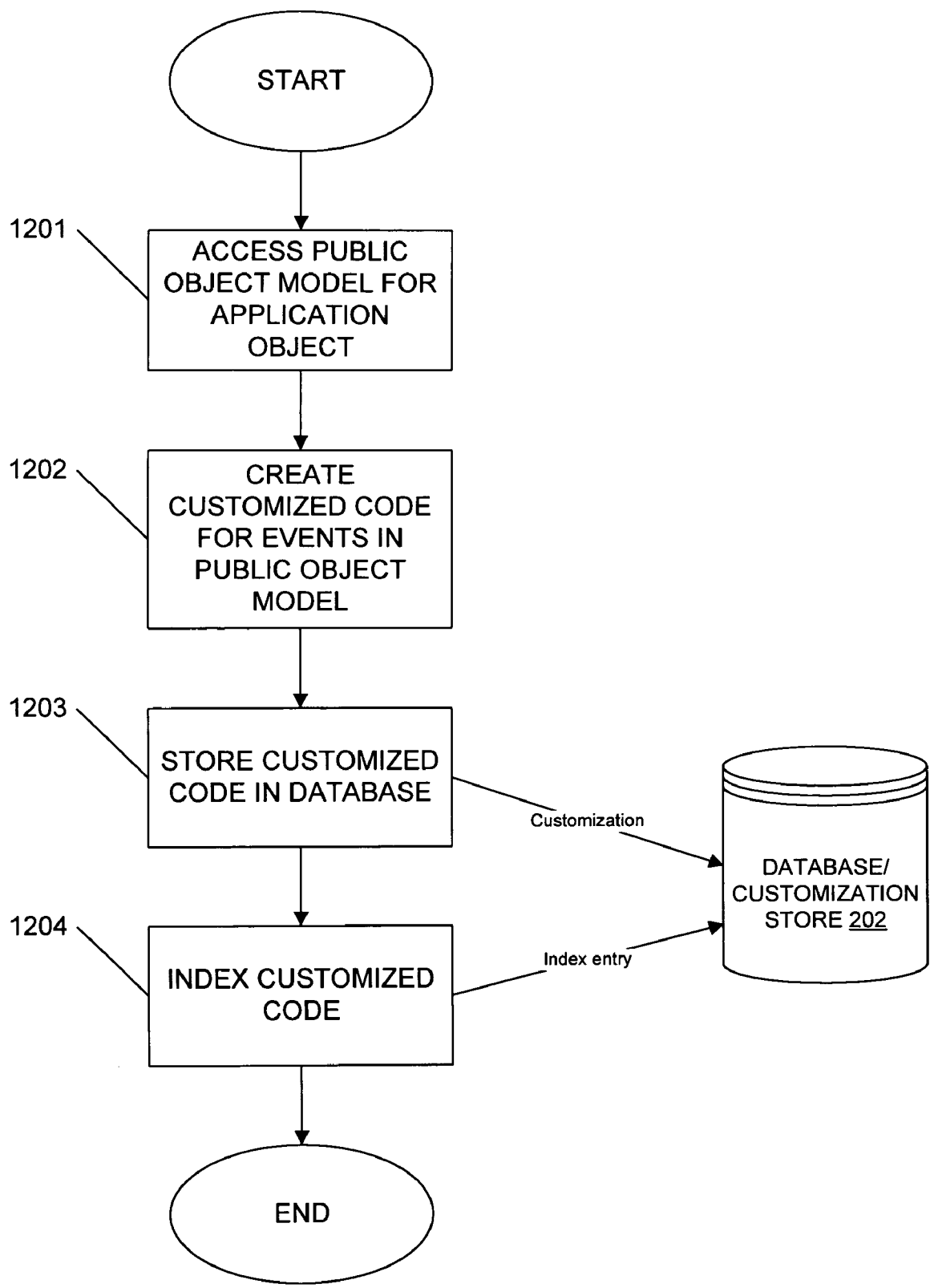
FIG. 12 is a flow diagram showing an exemplary process by which customized code may be created and stored.

FIG. 12 shows an exemplary process by which a customization 320 may be created for use with application object 201*a*. At step 1201, a programmer who desires to write a customization for use with application object 201*a* accesses the public object model 302, which, as discussed above, includes a list of public methods 311 and a list of events 312 that are fired by application object 201*a*. It will be observed that a well-designed application object 201*a* will have events in "interesting" places—i.e., points during the operation of application object 201*a* where users may wish to perform additional custom actions. The exact placement of events within application object 201*a* is determined by the nature of the task that application object 201*a* is designed to perform. As previously indicated, if application object 201*a* is designed to prepare invoices, then an example of a useful place for an event is following the computation of the subtotal.

At step 1102, the programmer creates customized code that "hooks into" application object 201*a* by using the events 312 and method 311 specified in public object model 302. For example, the public object model may indicate that, at some point during its execution, application object 201*a* will invoke an event 312 called "EventA" and that EventA takes an integer value as a parameter. In this case, the programmer can write a function called "EventA" which accepts an integer value as a parameter, and which performs some operations specified by the programmer. The programmer may also use public methods 311 in writing the code that responds to events. For example, public object model 302 may disclose that application object 201*a* exports a method called "Subtotal" whose return value is the subtotal of all items on an invoice, and this method may be called in the code that the programmer write—for example, in the code for the custom-written function called "EventA."

A programmer may be assisted in the performance of step 1202 by the use of a "script engine" which compiles textual descriptions of instructions into machine-readable instructions. The script engine may also insert or inject other code (such as start-up code 305, shown in FIG. 3) into the binary form of customization 320. This extra code is not generated by the programmer, but rather is inserted by a special purpose script engine that is designed to compile programs in a manner such that they can work with an application object 201*a* in the manner described herein. For example, the start-up code 305 generated by the script engine may enable the linking of event handler(s) 304 with the event(s) 312 fired by application object 201*a*. Start-up code 305 may also contain a globally accessible variable that contains a pointer or "handle" to public object model 302 of application object 201*a*. The script engine will generate the aforementioned code in a source language that it itself understands and then compile it to binary form along with the customization(s).

At step 1203, the compiled code is inserted into: a customization store/database 202. As noted above, the code is preferably in binary form at this point, which allows for it to be loaded and executed faster than if it were stored as an interpretable script. However, it should be noted that customization store/database 202 can also store customization code in a source-level language, in which case the code may be compiled "on the fly" as it is retrieved from customization store/database 202.

At step 1204, the customized code is indexed in the database. The indexing may, for example, be by rows and columns (or by additional dimensions in a more-than-two-dimensional matrix). Preferably, the manner in which a customization is indexed is closely related to its moniker 800. For example, each dimension of the matrix may represent a particular field 801 in the moniker 800 for customization 320. The process of indexing the customization 320 may, in fact, begin with the process of creating a moniker 800 for the customization. For example, the programmer may be queried as to what application, module, department, user, etc., the customization applies to, so that a moniker 800 can be created on this basis.

Once the customization 320 is stored in customization store/database 202 and indexed therein, it is available to be called by application object 201a in appropriate circumstances.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of executing a computer program, each instantiation of which comprises at least two modules, the method comprising:
    loading a first module on a computing device, there being a plurality of different contexts in which the computer program can be instantiated, said first module being loaded when the computer program is instantiated in any one of said plurality of contexts;
    the first module identifying, from among said plurality of contexts, a first context that is presently in existence;
    the first module obtaining fixed data from a binary file;
    the first module obtaining environmentally-derived data from an operating environment on the computing device;
    the first module creating a label comprising the fixed data and the environmentally-derived data;
    the first module transmitting a database query comprising said label to a lookup module;
    the lookup module using said label to identify a second module to be retrieved, wherein the second module is identified from among an existing plurality of modules, and wherein each different label that may be generated is associated with a different second module;
    transmitting, from said lookup module, a handle referencing said second module; and
    the first module loading said second module using said handle.

2. The method of claim 1, wherein the environmentally-derived data comprises:
    a name of a department of an organization in which the computer program is being used, wherein each different department in which the computer program is used results in a different label being generated and a different module identified.

3. The method of claim 1, wherein the fixed data comprises:
    a name of the computer program; and
    a name of a subcomponent of the computer program.

4. The method of claim 3, wherein the fixed data further comprises:
    a name of an organization in which the computer program is being used.

5. The method of claim 1, wherein the environmentally-derived data comprises:
    a name of a department of said organization in which the computer program is being used.

6. The method of claim 5, wherein said first module includes instructions to signify an occurrence of at least one event, and wherein said second module performs actions only in response to the at least one event signified by said first module.

7. The method of claim 6, further comprising:
    publishing an interface to said events and a format of said label to permit software developers to write modules that respond to said events and that are identified by a label in said format.

8. A computer-readable storage medium having stored thereon information comprising:
    a first module of a computer program loaded on a computing device, said first module being used with a plurality of instantiations of said computer program;
    an existing plurality of second modules of said computer program, each of said second modules corresponding to a different context in which said computer program can be instantiated, each of said different contexts in which said computer program can be instantiated causing said computer program to be used with a different one of said second modules, each of said second modules being indexed in a module store based on a label that is descriptive of the context to which each of said second modules correspond, each of the labels comprising:
    fixed data and environmentally-derived data; and
    computer-executable instructions that cause said computer program to be loaded by performing acts comprising:
    loading said first module; and
    determining the fixed data from a binary file;
    determining the environmentally-derived data from an operating environment on the computing device;
    the first module creating a label that is descriptive of said context, said label comprising the fixed data and the environmentally-derived data;
    the first module transmitting a database query comprising said label to a lookup module;
    the lookup module retrieving the one of said second modules that is identified by said label; and
    the first module loading the retrieved second module, wherein each different label that may be generated is associated with a different module that may be retrieved for loading.

9. The computer-readable storage medium of claim 8, wherein said environmentally-derived data comprises:
    a name of a department of an organization in which the computer program is being used, wherein each different department in which the computer program is used results in a different label being generated and a different module identified.

10. The computer-readable storage medium of claim 8, wherein said fixed data comprises:
    a name of the computer program; and
    a name of a subcomponent of the computer program.

11. The computer-readable storage medium of claim 10, wherein said environmentally-derived data comprises:
    a name of an organization in which the computer program is being used.

12. The computer-readable storage medium of claim 11, wherein said environmentally-derived data further comprises:
    a name of a department of said organization in which the computer program is being used.

13. The computer-readable storage medium of claim 12, wherein said first module includes instructions to signify an occurrence of events, and wherein said second module performs actions only in response to events signified by said first module.

14. The computer-readable storage medium of claim 13, further comprising:
    publishing an interface to said events and a format of said label to permit software developers to write modules that respond to said events and that are identified by the label in said format.

15. A system for executing a computer program that is customizable based on context, the system comprising:
    a computing device configured with a computer-readable storage medium comprising a first module of the computer program, the first module being loadable with an instantiation of the computer program for each one of a plurality of different contexts in which the computer program can be used,
    a plurality of existing second modules of the computer program, each of the plurality of second modules being identified by and associated with a module label, each of the labels comprising fixed data and environmentally-derived data, and
    software that instantiates the computer program when executed on the computing device by performing acts comprising:
        loading said first module and executing the first module, the first module performing acts comprising:
            determining the fixed data from a binary file;
            determining the environmentally-derived data from an operating environment on the computing device;
            creating a label comprising the fixed data and the environmentally-derived data;
        transmitting a database query comprising said label to a lookup module, the lookup module selecting one of said plurality of second modules by comparing said label with the module labels of said plurality of second modules and transmitting a handle referencing said second module to said first module, such that any two different labels that may be generated are associated with different second modules;
        retrieving the selected module from a module store in which said plurality of second modules are indexed based on their respective labels; and
        loading the retrieved second module using said handle.

16. The system of claim 15, wherein said environmentally-derived data comprises:
    a name of a department of an organization in which the computer program is being used, wherein each different department in which the computer program is used results in a different label being generated and a different second module selected.

17. The system of claim 16, wherein said fixed data comprises:
    a name of the computer program; and
    a name of a subcomponent of the computer program.

18. The system of claim 17, wherein said environmentally-derived data further comprises:
    a name of said organization.

19. The system of claim 18, wherein said first module includes instructions to signify an occurrence of events, and wherein each of said second modules performs actions only in response to events signified by said first module.

20. The system of claim 19, further comprising:
    publishing an interface to said events and a format of said label to permit software developers to write modules that respond to said events and that are identified by a label in said format.

* * * * *